US010486865B2

(12) United States Patent
Destal et al.

(10) Patent No.: US 10,486,865 B2
(45) Date of Patent: Nov. 26, 2019

(54) REMOVABLE CLOSURE AND COATING SYSTEM

(71) Applicant: Valspar Sourcing, Inc., Minneapolis, MN (US)

(72) Inventors: Delphine Destal, Bouaye (FR); Marie-Edith Quereau, Orvault (FR); Philippe Michel, Le Temple de Bretagne (FR); Benoit Prouvost, l'Abergement (FR)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/026,895

(22) PCT Filed: Sep. 24, 2014

(86) PCT No.: PCT/US2014/057131
§ 371 (c)(1),
(2) Date: Apr. 1, 2016

(87) PCT Pub. No.: WO2015/050755
PCT Pub. Date: Apr. 9, 2015

(65) Prior Publication Data
US 2016/0244212 A1    Aug. 25, 2016

Related U.S. Application Data

(60) Provisional application No. 61/885,632, filed on Oct. 2, 2013, provisional application No. 61/976,845, filed on Apr. 8, 2014, provisional application No. 62/036,866, filed on Aug. 13, 2014.

(51) Int. Cl.
*B65D 41/02* (2006.01)
*C09D 167/02* (2006.01)

(52) U.S. Cl.
CPC ......... *B65D 41/023* (2013.01); *C09D 167/02* (2013.01); *B32B 2435/02* (2013.01)

(58) Field of Classification Search
CPC ....... B65D 41/023; C09D 67/02; C08L 61/12; B32B 2435/02
See application file for complete search history.

(56) References Cited

U.S. PATENT DOCUMENTS

| | | |
|---|---|---|
| 2,877,922 A | 3/1959 | De Cristoforo |
| 4,021,396 A | 5/1977 | Wu |
| 4,124,554 A | 11/1978 | Fry |
| 4,207,222 A | 6/1980 | Blum et al. |
| 4,247,439 A | 1/1981 | Matthews et al. |
| 4,393,119 A | 7/1983 | Cocannon |
| 4,442,246 A | 4/1984 | Brown et al. |
| 4,446,258 A | 5/1984 | Chu et al. |
| 4,476,262 A | 10/1984 | Chu et al. |
| 4,480,058 A | 10/1984 | Ting et al. |
| 5,296,525 A | 3/1994 | Spencer |
| 5,830,952 A | 11/1998 | Pedersen et al. |
| 6,084,036 A | 7/2000 | Carney et al. |
| 6,087,417 A | 7/2000 | Stevenson et al. |
| 6,143,841 A | 11/2000 | Spittka et al. |
| 6,217,960 B1 | 4/2001 | Groen in't Woud et al. |
| 6,300,428 B1 | 10/2001 | Stevenson et al. |
| 6,476,119 B1 | 11/2002 | Kucera et al. |
| 6,586,505 B1 | 7/2003 | Cronin et al. |
| 7,189,787 B2 | 3/2007 | O'Brien et al. |
| 8,092,876 B2 | 1/2012 | O'Brien et al. |
| 9,862,584 B2 | 1/2018 | Clusserath |
| 2004/0044117 A1* | 3/2004 | Kiefer-Liptak ......... C08L 67/02 524/523 |
| 2004/0132895 A1* | 7/2004 | Ambrose ............... C08F 283/02 524/523 |
| 2006/0199911 A1 | 9/2006 | Markovich et al. |
| 2006/0229415 A1 | 10/2006 | Boyer et al. |
| 2009/0047524 A1 | 2/2009 | Yaoi et al. |
| 2010/0068433 A1 | 3/2010 | Gibanel et al. |
| 2010/0178442 A1 | 7/2010 | O'Brien et al. |

(Continued)

FOREIGN PATENT DOCUMENTS

| | | |
|---|---|---|
| CN | 101517020 A | 8/2009 |
| CN | 102264791 A | 11/2011 |

(Continued)

OTHER PUBLICATIONS

Wicks, Zeno et al., Organic Coatings: Science and Technology, vol. 1, pp. 122-132 (John Wiley & Sons: New York, 1992).

(Continued)

*Primary Examiner* — William P Fletcher, III
(74) *Attorney, Agent, or Firm* — Kagan Binder, PLLC

(57) ABSTRACT

The present invention provides coating systems that use polycyclic polyester resins in combination with phenolic resins. The combination of these resin materials provides a coating composition that provides cured coatings with excellent adhesion, blush resistance, stain resistance, and corrosion resistance in a single coating composition. This makes the coating compositions well suited for use to form coatings on closures used in the packaging industry for food and beverages. In many embodiments, even though PVC and BPA materials are excluded, the coating compositions provide monocoats whose performance substantially matches and even exceeds the performance of monocoats formed from PVC and BPA containing materials.

25 Claims, 1 Drawing Sheet

(56) References Cited

U.S. PATENT DOCUMENTS

| | | | |
|---|---|---|---|
| 2010/0260954 A1* | 10/2010 | Stenson | C08G 18/423 428/35.8 |
| 2011/0220645 A1* | 9/2011 | Niederst | B32B 15/08 220/200 |
| 2011/0288232 A1 | 11/2011 | Rademacher et al. | |
| 2011/0290696 A1* | 12/2011 | Stenson | C08G 18/423 206/524.3 |
| 2012/0118785 A1 | 5/2012 | Kainz et al. | |
| 2012/0125799 A1 | 5/2012 | Doreau et al. | |
| 2012/0145721 A1 | 6/2012 | Cavallin et al. | |
| 2012/0276315 A1* | 11/2012 | Michel | B05D 7/14 428/35.9 |
| 2012/0302690 A1 | 11/2012 | Cunningham et al. | |
| 2013/0206756 A1 | 8/2013 | Niederst et al. | |
| 2013/0280454 A1 | 10/2013 | Telford et al. | |
| 2013/0316109 A1 | 11/2013 | Niederst et al. | |
| 2015/0376435 A1 | 12/2015 | Youlton et al. | |
| 2016/0221733 A1 | 8/2016 | Prouvost et al. | |

FOREIGN PATENT DOCUMENTS

| | | |
|---|---|---|
| GB | 1459843 | 12/1976 |
| WO | 99/37722 A1 | 7/1999 |
| WO | 2008/036629 A2 | 3/2008 |
| WO | 2008/137562 A1 | 11/2008 |
| WO | 2010062928 A | 6/2010 |
| WO | 2010/097353 A2 | 9/2010 |
| WO | 2011/130671 A2 | 10/2011 |
| WO | 2011149449 A1 | 12/2011 |
| WO | 2012/089747 A1 | 7/2012 |
| WO | 2013/079718 A1 | 6/2013 |
| WO | 2013/079719 A1 | 6/2013 |
| WO | 2013/098218 A1 | 7/2013 |

OTHER PUBLICATIONS

Wicks, Zeno et al., Organic Coatings: Science and Technology, vol. 1, pp. 184-186 (John Wiley & Sons: New York, 1992).

Plenco, "Phenolic Novolac and Resol Resins" http://www.plenco.com/phenolic-novolac-resol-resins.htm, [retrieved on Jul. 26, 2017], pp. 1-7.

Biedermann, M., and Grob, K. (2006) "Phenolic Resins for Can Coatings: II. Resoles Based on Cresol/Phenol Mixtures or Tert. Butyl Phenol." LWT—Food Science and Technology, 39:647-659.

* cited by examiner

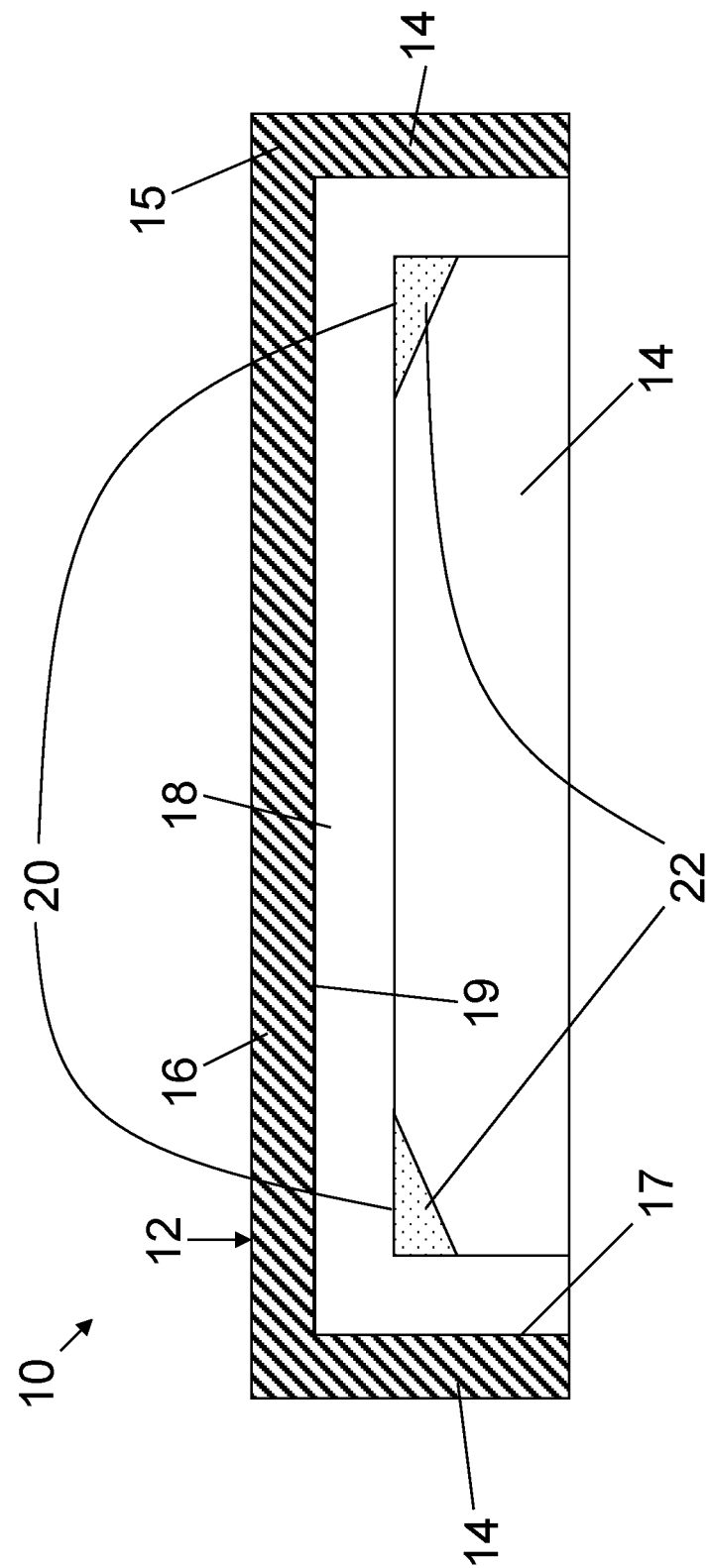

REMOVABLE CLOSURE AND COATING SYSTEM

PRIORITY CLAIM

The present patent Application claims priority to International No. PCT/US2014/057131, filed Sep. 24, 2014, which in turn claims priority under 35 USC § 119(e) from U.S. Provisional Patent Application Ser. No. 61/885,632, filed on Oct. 2, 2013, titled REMOVABLE CLOSURE AND COATING SYSTEM, U.S. Provisional Patent Application Ser. No. 61/976,845, filed on Apr. 8, 2014, titled REMOVABLE CLOSURE AND COATING SYSTEM and U.S. Provisional Patent Application Ser. No. 62/036,866, filed on Aug. 13, 2014, titled REMOVABLE CLOSURE AND COATING SYSTEM, wherein the entirety of said patent applications are incorporated herein by reference for all purposes.

TECHNICAL FIELD

The present invention relates to removable closures for packaging containers, coating compositions useful in such closures, and processes for making such coating compositions.

BACKGROUND OF THE INVENTION

The application of coatings to metals to inhibit corrosion is well established. This is particularly true in the area of packaging containers such as metal food, beverage containers and twist off caps. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food, beverage containers and closures such as twist off caps to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Conventional closures for packaging containers incorporate one or more coatings that are typically derived from physical and/or chemically curable formulations that include one or more thermoplastic and/or thermosetting resins. (e.g., vinyl chloride polymers such as, for example, poly(vinyl chloride) ("PVC")), or epoxy-derived resins).

When these coatings are applied to a substrate and cured, the coatings and/or the coated substrate can degrade and/or discolor. For example, the degradation products from PVC-based coatings, such as hydrochloric acid ("HCl"), can attack the substrate. Additionally, these degradation products may cause yellowing of white closures. To stabilize thermoplastic materials such as PVC and reduce degradation, epoxy resins and/or other stabilizers typically are added to the coating formulations. It has been a common practice to use epoxy novolacs and epoxidized linseed oil. These epoxy resins typically incorporate polyglycidyl ethers of aromatic polyols such as bisphenol A diglycidyl ether (often referred to as "BADGE").

Coatings derived from epoxy functional materials may include small amounts of (i) unreacted bisphenol A ("BPA") or the epoxidized ethers of aromatic polyols such as BADGE; and/or (ii) low-molecular-weight components containing BPA or BADGE. In the food packaging industry, these materials potentially can migrate into packaged foodstuffs over time. In addition, conventional coating systems for use in packaging applications that require exposure to aggressive or corrosive food or beverage products often use a BPA- or BADGE-containing epoxy-phenolic size coat in combination with a topcoat formulation containing thermoplastic materials such as PVC.

Although the balance of scientific evidence available to date does not indicate clearly that traces of the aforementioned compounds pose health risks to humans, these compounds are perceived by some as being potentially harmful to human health. Consequently, there is a desire to reduce or eliminate these compounds from food-contact coatings. However, it has been problematic to formulate coating formulations without these materials, or with these materials that exhibit very low or non-detectable levels of mobile forms of these compounds, while still retaining desired coating characteristics (e.g., flexibility, adhesion, corrosion resistance, stability, abrasion resistance, etc.).

Many commercially available coatings systems are based on a two-layer system. A first layer functions as a base (also referred to as a primer or size layer) applied to the substrate. A second layer is provided on the base layer to function as a top coat. The combination of layers provides levels of performance (e.g, adhesion, blush resistance, stain resistance, and corrosion resistance) that cannot be achieved by either layer alone.

Other commercially available coating systems are based on a single layer, or monocoat system. Monocoat systems offer the potential to be substantially more economical and efficient to manufacture. A monocoat involves a single composition that is applied as a single layer to the substrate and cured to form the monocoat. Consequently, the single coating must demonstrate the desired levels of performance (e.g, adhesion, blush resistance, stain resistance, and corrosion resistance) on its own without contribution from other coating formulations. It is challenging to develop monocoat systems that can demonstrate so many desired levels of performance. This is one reason why more expensive multilayer coating systems still dominate the market for closure coatings.

Monocoat systems that incorporate PVC resins and epoxy functional phenolic resins derived from BPA generally are viewed as setting the performance standard by which monocoat systems are judged. It is desirable to formulate monocoats without PVC and BPA content. However, formulating such alternative monocoat systems that match or approach the performance of the PVC/BPA systems has proven to be a significant challenge. As a result, there is a continuing and strong need for improved, alternative coating compositions that can be used in monocoat systems, particularly in the packaging industry for food and beverages.

SUMMARY OF THE INVENTION

The present invention provides coating systems that use polyester resins, preferably a polycyclic polyester resin, in combination with phenolic resins, preferably an alkylated phenolic resin. The combination of these resin materials provides a coating composition that provides cured coatings with excellent adhesion, blush resistance, stain resistance, and corrosion resistance in a single coat (or "monocoat") application. This makes the coating compositions well suited for use to form coatings on closures used in the packaging industry for food and beverages. In many embodiments, even though PVC and BPA materials are excluded, the coating compositions provide monocoats whose performance substantially matches and even exceeds the performance of monocoats formed from PVC and BPA containing materials.

In one aspect, the invention comprises a removable closure for a packaging article. The closure comprises:
 (a) a substrate having an interior and an exterior surface;
 (b) an at least partially cured monocoat coating provided on at least a portion of the interior surface of the substrate, said coating derived from ingredients comprising:
  (i) at least one first polycyclic polyester, wherein the polycyclic polyester comprises first and second fused rings that share at least two atoms in common; and
  (ii) at least one first crosslinkable phenolic resin; and
 (c) optionally a gasket applied onto at least a portion of the coating in a manner effective to help the closure sealingly engage the container.

In another aspect, the invention provides a method of making a removable closure for packaging article. The method comprises the steps of:
 (a) providing a metal-containing substrate;
 (b) providing a coating composition, said coating composition incorporating ingredients comprising:
  (i) at least one polycyclic polyester resin, wherein the polycyclic polyester resin comprises first and second fused rings that share at least two atoms in common; and
  (ii) at least one crosslinkable phenolic resin; and
  wherein the coating composition is substantially free of resins and resin precursors comprising covalent halogen-containing functionality, and wherein the coating composition is substantially free of resins and resin precursors incorporating bisphenol A;
 (c) applying the coating composition onto at least a portion of a surface of the substrate under conditions effective to provide a dried coating having an average dry film weight of 1 to 25 grams per square meter of coated surface area;
 (d) at least partially curing the applied coating composition to form a coating on the substrate;
 (e) forming the coated substrate into a removable closure comprising the coating on an interior surface of the closure; and
 (f) providing a gasket to at least a portion of the coating on the interior surface of the closure.

In preferred embodiments, the polyester resin, which is preferably a polycyclic polyester polymer, has a number average molecular weight of at least 4,000 and a glass transition temperature of at least 30° C. In preferred embodiments, the crosslinkable phenolic resin is a resole phenolic resin, more preferably an alkylated resole phenolic resin.

In another aspect, the invention comprises a coating system. The system comprises at least a fluid, first coating composition, said first coating composition comprising:
 (a) at least one polycyclic polyester resin, wherein the polycyclic polyester resin comprises first and second fused rings that share at least two atoms in common; and wherein the polycyclic polyester polymer has a number average molecular weight of at least 4,000, a glass transition temperature of at least 30° C., and a hydroxyl number of less than 25; and
 (b) at least one crosslinkable, resole phenolic resin; and wherein the coating composition is substantially free of resins and resin precursors comprising covalent halogen-containing functionality, and wherein the coating composition is substantially free of resins and resin precursors incorporating bisphenol A.

The coating compositions of the invention are especially useful for use on the interior surface of closures that are meant to seal the opening of a variety of containers. In many embodiments, the closures are removable from and, optionally, replaceable onto the container. Examples of such removable closures include twist-off closures for food packages, including cans, bottles, etc., and single use containers such as the pull off closures on beverage containers, etc.

The coating compositions of the invention protect the coated substrate against staining (e.g., yellowing), corrosion, moisture damage, acid damage, alkaline damage, and/or other chemical or physical damage such as damage caused by the contents of the container. They also impart coating hardness. Many embodiments would be suitable for prolonged food and beverage contact, making corresponding coatings useful for protecting food and beverage containers.

Additionally, the coating compositions of the invention exhibit excellent substrate, inter-layer (if any), and gasket adhesion. The coating compositions also demonstrate a balance of flexibility and hardness that allows them to be applied to a substrate sheet (e.g., a metal sheet). After coating, the coated sheet may then be formed into a desired shape (e.g., via stamping), such as a twist-off closure, without undue loss (if any) of adhesion to sheet or a loss of inter-layer adhesion.

Unless otherwise specified, the following terms as used herein have the meanings provided below.

The term "substantially free" with respect to a particular compound (or mobile forms of that compound if the term is used to refer to such mobile forms) means that a cured coating of the present invention contains less than 100 parts per million (ppm) of that compound (or mobile forms thereof if specified). As used herein, "ppm" or "ppb" (see below) are on a weight basis unless otherwise noted.

The term "essentially free" with a respect to a particular compound (or mobile forms of that compound if the term is used to refer to such mobile forms) means that a cured coating of the present invention contains less than 10 parts per million (ppm) of that compound (or mobile forms thereof if specified).

The term "essentially completely free" of a particular compound means that a cured coating of the present invention contains less than 1 part per million (ppm) of that compound.

The term "completely free" of a particular compound means that a cured coating of the present invention contains less than 20 parts per billion (ppb) of that compound (or mobile forms thereof if specified).

If the aforementioned phrases are used without the term "mobile" (e.g., "substantially free of BPA compound") then a cured coating of the present invention contains less than the aforementioned amount of the compound in any form, e.g., the compound is mobile in the coating or bound to or otherwise incorporated into a constituent of the coating.

The term "mobile" means that the compound can be extracted from the cured coating when a coating (typically ~1 mg/cm$^2$ (6.5 mg/in$^2$) thick) is exposed to HPLC-grade acetonitrile for 24 hours at 25° C.

The term "sealing composition" refers to a material applied to a coating system on an interior surface of a closure (e.g., twist off lids or caps) for purposes of helping to seal the closure to a container. In some embodiments, a sealing compound also is referred to as a gasket compound or a gasketing compound because the sealing composition is used to form a gasket on the coating system. In a typical mode of practice, the sealing composition is applied as a fluid composition onto the coating system in order to form a gasket precursor. The precursor is then dried, crosslinked, and/or otherwise chemically and/or physically cured to form a gasket.

The term "organosol" refers to a dispersion of organic particles, e.g., particles comprising one or more thermoplastic resins (e.g., PVC particles) optionally in combination with one or more other ingredients or reaction products thereof, in a liquid carrier that includes an organic solvent. In addition to solvent, the liquid carrier may incorporate one or more other optional ingredients, e.g., at least one plasticizer, surfactant, etc.

The term "plastisol" refers to a dispersion of organic particles in a liquid phase comprising at least one plasticizer.

The term "resin" means an oligomer and/or polymer. Oligomers or polymers may include polymerizable functionality that allows the resin to be further polymerized, cross-linked, or otherwise reactive as desired.

The term "oligomer" means a compound incorporating from two to ten repeating units.

The term "polymer" means a compound incorporating 11 or more repeating units. Repeating units typically are derived from one or more monomers.

A monomer generally includes at least one polymerizable moiety and generally constitutes a single repeating block when incorporated into an oligomer or polymer. A monomer may be incorporated into oligomers or polymers via co-polymerization with itself or with one or more other kinds of monomers, oligomers, and/or polymers. Non-polymerizable terminal moieties, e.g., a monoalcohol or alkoxy group with no additional reactive functional group, are not considered repeating units for purposes of the present invention.

Monomers often have number average molecular weights in the range from about 50 to about 1,000. Oligomers often have number average molecular weights in the range from about 100 to about 10,000, even from about 250 to about 5,000. Polymers often have number average molecular weights in the range from about 1,000 to 1,000,000 or even from about 2,000 to about 250,000, or even from about 2,000 to about 50,000, or even 3,000 to 25,000.

The term "crosslinker" refers to a molecule capable of forming a covalent linkage between two or more resins or between two or more different regions of the same resin. Some embodiments of crosslinkers may be resins. A resin may be a crosslinker for one or more other resins or resin precursors. A resin may be a crosslinker that is self-cross-linking.

The term "polymer" includes both homopolymers (repeating units are derived from the same monomer) and copolymers (i.e., polymers of two or more different monomers). Similarly, "oligomer" includes both homo-oligomers and co-oligomers.

The terms "comprises", "having", "including", "incorporating", and variations thereof do not have a limiting meaning where these terms appear in the description and claims but rather are intended to be open-ended.

The terms "preferred" and "preferably" refer to embodiments of the invention that may afford certain benefits in some modes of practice. However, other embodiments may also be preferred or otherwise suitable, under the same or other circumstances. Furthermore, the recitation of one or more preferred embodiments does not imply that other embodiments are not useful, and such recitation is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc. and at least 1 includes 1, 1.03, 1.5, 2, 17, etc.).

BRIEF DESCRIPTION OF THE DRAWING

The FIGURE schematically shows a side view in cross section of an illustrative closure of the present invention.

DETAILED DESCRIPTION OF PRESENTLY PREFERRED EMBODIMENTS

The details of one or more embodiments of the invention are set forth in the description below and the summary above. Other features, objects, and advantages of the invention will be apparent from the summary above and the description and the claims that follow. The following description of the present invention is not intended to describe every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The present invention provides a removable closure for a packaging article, a coating composition system useful to form a protective coating system on the closure, the resultant coating systems, and associated methods of making such closures, and systems. The coating composition is preferably applied directly (i.e., the coating composition directly contacts the substrate) or indirectly (i.e., there is one or more intervening layers between at least a portion of the coating composition and at least a portion of the substrate) to the desired substrate to form a coating proximal to the substrate. A significant advantage of the resultant coating is that it shows excellent adhesion to both the substrate and to gasket material. Further, the resultant coating shows excellent chemical resistance to items such as acidic food and beverage items. The coating also shows excellent stain resistance. This means that the coating can function both as primer layer and top coat layer to provide a monocoat system without the need for other coating composition to serve as the base layer or topcoat layer, as the case may be.

In some instances, the metal used to form a substrate could be subjected to one or more pre-treatment steps by the manufacturer of the metal sheet used to form the substrate. In some instances, these are chemical treatments. In some instances, the sheet might be sprayed with a solution of polyacrylic acid or dipped in such a solution. These pre-treatments may deposit one or more, relatively thin layers on the metal substrate. Such layers may be organic, inorganic, or combinations of these. Such pre-treatment layers are considered to be part of the metal substrate. Thus, if such a substrate were to be coated with a single polymer layer using principles of the present invention, the resultant polymer coating is still referred to as a monocoat, not a multilayer coating, in the packaging industry.

The ability of the coating system of the present invention to have excellent monocoat performance is unexpected for a composition that is substantially free of BPA and PVC components. The conventional wisdom is that BPA and/or PVC constituents are needed to provide monocoat systems with satisfactory adhesion, chemical resistance, and stain resistance. A significant challenge occurs when BPA and/or PVC constituents are excluded, because in many instances adhesion comes at the expense of chemical or stain resistance and vice versa. For example, a polyester resin conventionally can be used to achieve adhesion, but incorporating phenolic resins into the coating according to conventional techniques would then unduly undermine adhesion to the gasket and/or substrate in order to achieve satisfactory chemical resistance. A significant achievement of the present invention is to appreciate that the combination of a polycyclic polyester resin and an alkylated phenolic resin are sufficiently compatible to allow high levels of adhesion and chemical resistance to be achieved in a single coating composition.

Therefore, coating compositions of the present invention advantageously are useful to form monocoat protection on the interior surfaces of removable closures for food or beverage containers. In such modes of practice, the coating composition functions as both a base layer and a topcoat layer via a single monocoat. Of course, the coating compositions are extremely versatile, and monocoat embodiments are not the only manner in which the present invention can be practiced. The coating compositions can be used in multilayer coating systems as well, if desired. For example, the coating compositions of the present invention can be coated on the substrate in two or more layers to build overall coating thickness. Such multilayer embodiments in practical effect are still a monocoat system because substantially the same composition is used as both the primer layer to adhere to the substrate and the top coat to adhere to the gasket and to provide a top surface that contacts a food or beverage item packaged in the container.

In other illustrative modes of practice, the coating composition of the present invention can be used as a base layer for a second coating composition that serves as a top coating. This first base coating also may be referred to as a size coating, or a primer coating in the industry. The second coating composition preferably is applied directly or indirectly to the first coating to form a second coating distal from the substrate. The second coating may be referred to as a topcoat, top coat, or top coating even though one or more additional, but optional coatings and/or other materials, such as a sealing compound, may be further applied to at least a portion of the second coating. Although the coating system may optionally include additional layers, some preferred embodiments of a multilayer coating system consist essentially of the first coating and the second coating optionally used in combination with a sealing compound. In other illustrative modes of practice, the coating composition of the present invention can be used as a top coating for a second coating composition that serves as the base layer.

In many embodiments, a sealing composition may be applied to at least a portion of the coating system in a manner effective to form a gasket that enhances the seal between the closure and a container. In some embodiments, the sealing composition is provided in the form of an annular gasket adhered directly or indirectly to the coating system or the container in a manner such that the gasket sealingly engages the container or closure (as the case may be), such as engaging a rim, when the closure is fit onto the container.

Examples of food or beverage products may include certain acid-based food or beverages, milk-based products, meat-based products, onions, sauerkraut, fish in sauce, marinades, mussels, fruits in sweet sauces, energy drinks, coffee drinks, soups, mustard, mayonnaise, ketchup, salad dressings, pickled vegetables, sauerkraut, etc.

The removable closure may also be used to protect interior surfaces of packaging for non-food products, e.g. hair spray, hair dye, paints and stains, joint compound, concrete mixes, glue, cleaning compositions, etching compositions, pharmaceuticals, nutraceuticals, fertilizers, and the like.

As previously discussed, conventional coating systems often use halogenated materials such as PVC and/or epoxy-containing resins in one or more layers of conventional coating systems. As used herein, a halogenated material refers to a material in which a halogen is covalently bound to the material. This is distinguished from a material in which a halogen atom is present as a counterion for ionic functionality. The epoxy-containing resins of such coating systems typically incorporate BPA, bisphenol F (BPF), BADGE, or other oxirane-containing compounds, which may be undesirable for the reasons previously discussed. Preferred coating systems of the present invention, however, exhibit good adhesion (substrate, interlayer (if any), and gasket adhesion) and corrosion resistance without using these materials.

While not presently preferred, coating compositions of the present invention optionally may incorporate one or more of PVC, BPA, BPF, BADGE, aromatic glycidyl ethers, or other oxirane-containing compounds, especially if such compounds are of a non-mobile form in the case of the bisphenols and the oxirane-containing compounds.

In preferred embodiments, coating compositions of the present invention are formulated in a manner such that corresponding cured coatings are substantially free of, more preferably essentially free of, even more preferably essentially completely free of, and most preferably completely free of one or more (or two or more, or three or more, or all) of the following compounds: (A) halogenated resins such as PVC resin(s): (B) mobile BPA, mobile BPF, mobile bisphenol S ("BPS") and mobile epoxides thereof compounds (e.g., BADGE and/or diglycidyl ethers of BPF (BFDGE) and/or BPS)); (C) products derived from any of the compounds in (B); (D) higher molecular weight resins including one or more of the compounds of (B) even if such are non-mobile; (E) mobile oxirane-containing compounds derived from ingredients including one or more of the compounds listed in (B). In some embodiments, the preferred sealing composition is also at least substantially free of mobile and bound bisphenol compounds, including epoxides thereof.

In some embodiments, coating compositions of the present invention are formulated in a manner such that corresponding cured coatings are substantially free of, more preferably essentially free of, even more preferably essentially completely free of, and most preferably completely free of bisphenols, including epoxides thereof (e.g., bisphenol diglycidyl ether compounds).

Exemplary packaging on which the closure of the invention may be used include, but are not limited to, cans such as beverage cans, food cans; drums, kegs, pails, decorative tins, tubes, bottles, jars, monoblocs, and the like. Exemplary closure devices include, but are not limited to, caps, lids such as thin aluminum foil based lids for yogurt and butter containers, or crown corks; closures for glass jars and bottles such as roll-on closures, vacuum closures, twist on/off lids, pilfer-proof closures, easy peel lids, and easy open end or conventional ends for cans. Cans on which the closures of the invention can be used include, for example, 2-piece cans or 3-piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like.

The coated closures of the invention may be formed via any suitable method. The coating compositions of the present invention may, for example, be applied to and at least partially cured on a substrate material, e.g. metal sheet, foil or the like. Next, the coated substrate may be formed into the final closure shape via the desired technique(s). Illustrative embodiments of the coating system are sufficiently flexible to allow shaping after the cured coatings are formed. If the coating is partially cured at the time the closure is shaped, the coating may be more completely cured after shaping.

The cured protective coating system exhibits not only good flexibility, but also excellent chemical resistance, stain resistance, blush resistance, and the like especially in the presence of foodstuffs containing acetic acid, citric acid and/or lactic acid, and without exhibiting undue loss of adhesion. In the alternative, a substrate may be formed into a closure, and then the closure may be coated with the coating composition system. The substrate or coated substrate (as the case may be) used in the closure may be formed via stamping, drawing, redrawing, wall ironing, bending, beading, embossing, debossing, flanging, necking, stretching, blow-stretching, and any other suitable conventional method.

In one aspect, the present invention provides a rigid metal closure (e.g., a twist-off metal lid which may include fastening features such as lugs or threads) for use in sealing a food or beverage packaging container. Such packaging or containers include, e.g., a glass or plastic jar or bottle configured to receive the threads, lugs, or other engagement structure of the closure. The metal closure preferably includes a coating system of the present invention applied on at least a portion of an interior surface (e.g., food-facing) of the metal closure as a food-contact coating. In one embodiment, a first layer composition forms a first coating adhered to the metal substrate and a second layer composition forms a second coating adhered to the first layer composition. Optionally, sealing compound (which may be either a conventional PVC-based sealing compound or a PVC-free sealing compound) may be applied directly to the second composition. In one embodiment, the closure is formed from metal sheet having the coating system cured on at least one side thereof.

The substrate can be formed from wide range of materials. Such materials include metallic materials, polymeric materials, combinations of these, and the like. In many modes of practice, the substrate includes one or more metallic materials such as metals, metal alloys, intermetallic compositions, metal containing composites, combinations of these, and the like. Metallic embodiments of the substrate may comprise one or more metals including, but not limited to, aluminum and aluminum alloys, tinplate, cold rolled low carbon mild steel ("ETP"), electrolytic chromium/chromium oxide coated cold rolled low carbon mild steel (ECCS), tin-free steel, black plate, corten steel, and any other steel.

The substrate may comprise one or more layers. Each layer may have a thickness in the range of from 0.01 μm (micrometer) to 2 mm (millimeter); for example, from 0.01 μm to 1.5 mm; or in the alternative, from 0.01 μm to 1 mm; or in the alternative, from 0.01 μm to 0.5 mm; or in the alternative, from 0.01 μm to 0.2 mm; or in the alternative, from 0.01 μm to 0.1 mm or in the alternative, from 0.01 μm to 100 μm; or in the alternative, from 0.01 μm to 50 μm; or in the alternative, from 1 μm to 50 μm; or in the alternative, from 1 μm to 15 μm.

In addition to the coating system, the substrate optionally may be pre-coated with one or more pre-coating compositions. Such pre-coating compositions optionally may include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleoresin, acrylic resin, and the like.

Exemplary crosslinkers used in a pre-coating (and optionally other coatings of the coating system) include, but are not limited to, phenol-formaldehyde resins; amino-formaldehyde resins including but not limited to urea-formaldehyde, melamine formaldehyde, benzoguanamine formaldehyde; anhydride resins, phenolic crosslinkers (e.g., phenoplasts), amino crosslinkers (e.g., aminoplasts), materials with blocked isocyanate functionality, materials with epoxy functionality including but not limited to polyesters, (meth) acrylic resins, vinyl resins or the like. Exemplary additives useful in coating compositions of the present invention include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum.

A coating composition of the present invention includes at least one polyester resin, more preferably at least one polycyclic polyester resin. The polycyclic polyester resin may be a thermoplastic or thermosetting resin that includes at least one ester linkage as part of the resin backbone. Further, unless otherwise indicated, the use of a term designating a resin class such as, for example, "phenolic" or "polyester," is intended to include resins that include linkages of that class optionally in combination with one or more additional kinds of polymerized linkages. For example, a polyester resin includes not only polyester linkage(s) but also may also include one or more urethane, urea, ether, carbamate, imide, amide, siloxane, bonds resulting from free radical polymerization, and/or other kinds of linkages.

A polycyclic polyester resin incorporates at least one polycyclic group-containing repeating unit. A single polycyclic polyester resin or a mixture of two or more different polycyclic polyester resins may be used according to the present invention. In preferred embodiments, a polycyclic polyester resin is linear and/or hydroxylated. One or more additional polyester resins without polycyclic character also may be included in the coating composition.

The term "polycyclic" when used in this context means that the compound comprises a plurality of ring moieties. As one advantage, and without wishing to be bound by theory, it is believed that the polycyclic character of the polyester resin component helps to impart flexibility to the cured coating. Also, the polycyclic character of the polyester resin component is believed to help improve corrosion protection, adhesion to the substrate and gasket material and/or to an optional second coating composition, stain resistance, acid resistance, blush resistance, and resistance to yellowing relative to compositions using only polyester resins without polycyclic character. In particular, it is it is believed that the polycyclic character helps to make the coating systems of the present invention suitable for holding corrosive food products such as sauerkraut and the like.

The polycyclic polyester character also is believed to help function as a plasticizer for the phenolic resin component. While not intending to be bound by theory, it is believed that the presence of the polycyclic groups is a key factor as to why preferred embodiments of the compositions provide coatings that have properties and performances that approach those of conventional coatings that incorporate PVC, BPA-based, BPF-based, BPFDGE-based, or BADGE-based epoxy resins. This is a significant performance result, as developing alternative formulations without resorting to PVC, BPA-based, BPF-based, BPFDGE-based, or BADGE-based epoxy resins has been very challenging and elusive.

Without wishing to be bound, it is also believed that the polycyclic character provides high Tg characteristics, inert reactivity with respect to other components of the coatings as well items stored in corresponding packages sealed with the closures, and plasticizing functionality. Such characteristics conventionally are associated with PVC resins, but not so much with polyester resins. Sharing such properties with PVC resins, the polycyclic polyesters in the practice of the present invention mimic PVC resins and are able to be used as alternatives to form PVC-free coatings with excellent performance conventionally associated with PVC-based formulations.

More preferably, the term "polycyclic" refers to a compound that includes at least two cyclic groups in which one or more atoms (and more typically two or more atoms) are present in the rings of the at least two cyclic groups. Thus, for example, fused rings sharing at least one atom are polycyclic according to this more preferred definition. Fused rings that share 1 atom are referred to as spiro rings. Other embodiments of fused rings share 2 or 3 or more atoms. A ring that shares 3 or more atoms with another ring is referred to as a bridged ring. The one or more polycyclic group(s) may be present in a backbone of the resin, a pendant group of the resin, or a combination thereof. In addition to the fused and bridged rings, the polycyclic polyester oligomer or polymer optionally may include one or more additional ring moieties. In a preferred embodiment, a backbone of the polycyclic polyester resin includes polycyclic group that includes bridged ring(s).

Some examples of polycyclic groups include those that are based on substituted or unsubstituted naphthalene or derivatives thereof. Examples of such derivatives include naphthalene dicarboxylic acid, a reaction product between hydroxyl functional naphthalene with a triol, naphtyl ethyl amine reaction product with triacid, or the like. Other aliphatic structures include the reaction product of borneol with a triacid (pendant) norbornane diamine.

Other examples of suitable polycyclic groups include bicyclic groups, tricyclic groups, and polycyclic groups including four or more rings. At least bicyclic polycyclic groups are presently preferred, with tricyclic groups being even more preferred, and tricyclic groups that include at least two bridged rings being especially preferred. Most preferably, the polycyclic polyester resins of the coating compositions comprise at least one polycyclic repeating unit comprising first and second fused rings that share first and second atoms in common and, in some embodiments, additionally at least one bridged ring sharing three or more atoms in common with at least one of the first and second fused rings. The rings of the polycyclic groups may be saturated (aliphatic) or unsaturated (aromatic or non-aromatic, more preferably non-aromatic). Tricyclodecane is an example of a preferred, tricyclic group according to this definition. It is contemplated that substituted tricyclodecane groups may also be used (e.g., where one or more organic groups or other suitable atoms or groups are substituted for one or more hydrogen atoms). It is also contemplated that one or more carbon atoms of the tricyclodecane groups may be replaced with one or more heteroatoms (e.g., N, O, P, S, Si, etc.). Repeating units derived from Formula A-D shown below are examples of preferred polycyclic repeating units.

The polycyclic groups can include any combination of suitably sized ring groups. For example, the polycyclic groups may include any combination of cyclic groups having 3-atom rings, 4-atom rings, 5-atom rings, 6-atom rings, 7-atom rings, and/or 8-atom or higher rings. Typically, carbon atoms constitute a majority, or all, of the atoms making up the rings. In some embodiments, though, the polycyclic groups may include one or more heteroatoms in addition to carbon atoms (e.g., nitrogen, oxygen, silicon, sulfur, phosphorus, etc.). In certain preferred embodiments, the polycyclic groups include two or more 5-atom rings, two or more 6-atom rings, or combinations of these, e.g., at least one 5-atom ring and at least one 6-atom ring.

The amount of polyester resin component incorporated into the coating compositions may vary over a wide range. The polyester resin component is typically present in an amount from about 5% to about 99%, preferably from about 30% to about 70%, and more preferably from about 40% to about 60% by weight based on the total weight of the resins included in the coating composition.

The amount of polycyclic content incorporated into the polycyclic polyester resins may vary over a wide range and may be expressed as the weight percent of the polycyclic content relative to the total weight of the polycyclic polyester resin. In illustrative embodiments, polycyclic groups constitute at least about 10 wt-%, more preferably at least about 20 wt-%, even more preferably at least about 30 wt-% of the first polymer. While the upper end is not especially limited, in some embodiments, the polycyclic content constitutes less than about 80 wt-%, less than about 60 wt-%, or less than about 40 wt-% of a polycyclic polyester resin.

Direct measurement of the weight of the polycyclic groups may not be reasonably feasible if determined after the polycyclic polyester resin is formed from its monomeric, oligomeric, or polymeric constituents. Accordingly, the weight percent of polycyclic content in the polycyclic polyester resin is deemed to be the weight percentage of polycyclic-containing monomer(s) and polycyclic non-polymerizable terminal and/or functionalizing reactants incorporated into a polycyclic polyester resin relative to the total weight of the monomers, terminal and/or functionalizing reactants used to make the polycyclic polyester resin. Separate crosslinking agents used to crosslink a polycyclic polyester resin to itself or to other resins are not included. Nor are the other resins included that are linked to a polycyclic polyester resin via crosslinking or other reaction.

For example, if a noncyclic polyester resin is formed from 100 parts by weight of reactants, and then the polyester is modified to include a polycyclic group via reaction with 5 parts by weight of a polycyclic species, then the corresponding wt-% of polycyclic content in the resultant polycyclic polyester resin is $100\% \times (5/(100+5))$. In another example, if a cyclic polyester is formed from 100 parts by weight of reactants in which 12 parts by weight of the reactants are polycyclic, then the resultant resin includes 12% by weight of polycyclic content. This may be based on a theoretical calculation if necessary. For example, in some embodiments, bicyclic groups are incorporated into a polycyclic polyester resin via a Diels-Alder reaction of cyclopentadiene across the double bond of an unsaturated monomer (e.g., maleic anhydride) present in the backbone of the polycyclic polyester resin. In this situation, the corresponding wt-% of polycyclic content in the resin is determined by deeming the cyclopentadiene and the maleic anhydride to be polycyclic reactants.

The polycyclic polyester resin(s) may constitute all or any portion of the polyester resins included in the polyester resin component of the coating compositions. If other polyester resin(s) are included these may be included in the polyester resin component in any amount. For example, some embodiments of the polyester resin component may include from 0.01 to 99.9, even from 1 to 95, or even from 10 to 95 weight percent of the polycyclic polyester resin based on the total weight of the polyester resins included in the composition.

Polycyclic groups may be terminal groups, part of a resin backbone, or pendant from an intermediate portion of a resin backbone. In some embodiments, the polyester resin includes polycyclic groups other than naphthalene type groups. A naphthalene group includes two, fused aromatic rings sharing two carbon atoms in common.

Some non-limiting examples of preferred divalent polycyclic groups according to this formula are provided below in Formulae A (based on tricyclodecane), B (based on bicyclo[4.4.0]decane) C (based on norbornane) and D (based on isosorbide):

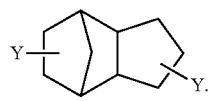

Tricyclodecane-based

A

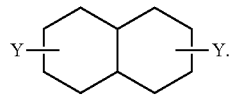

Bicyclo[4.4.0]decane-based

B

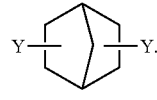

Norbornane-base
(and/or unsaturated
counterparts
of these such as
norbornene-based
groups)

C

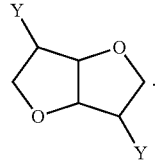

Isosorbide-based,
isoidide-based,
and/or
isomannide-based

D

In these formulae, each Y independently is a bond, desirably a single bond, that connects the polycyclic group to another portion of the resin. The Y bonds for each group may be pendant from the same or different rings. The isosorbide-based group, for purposes of illustration, shows each Y pendant from different rings. The above polycyclic groups are each represented as unsubstituted, aliphatic, divalent groups. That is, each of the above polycyclic groups includes first and second Y bonds. In other embodiments, such groups may include only a single Y bond. In other embodiments, such groups may include 3 or more Y bonds. It is also within the scope of the invention that variants of any of the above polycyclic structures may be used such as, for example, substituted variants thereof, unsaturated variants thereof, or structural isomers thereof (e.g., where the substituent(s) and/or heteroatom(s) are located on different positions of one or more rings). An example of an unsaturated variant of a norbornane group is a norbornene group. Additional examples of suitable polycyclic groups for use in the polymer of the present invention are provided in U.S. Application No. 2010/0260954.

In some embodiments, the one or more polycyclic groups are unsaturated bicyclic groups represented by the IUPAC (International Union of Pure and Applied Chemistry) nomenclature of Expression (I) below:

bicyclo[x.y.z]alkene,     (Expression I)

wherein:
x is an integer having a value of 2 or more,
y is an integer having a value of 1 or more,
z is an integer having a value of 0 or more, and
the term alkene refers to the IUPAC nomenclature designation (e.g., hexene, heptene, heptadiene, octene, etc.) for a given bicyclic molecule and denotes that the bicyclic group includes one or more double bonds (more typically one or more carbon-carbon double bonds).

In some embodiments, z in Expression (I) is 1 or more. In other words, in certain embodiments the bicyclic groups are bridged bicyclic groups. By way of example, bicyclo[4.4.0] decane is not a bridged bicyclic structure. In some embodiments, x has a value of 2 or 3 (more preferably 2) and each of y and z independently have a value of 1 or 2. Non-limiting examples of some suitable unsaturated bicyclic groups represented by Expression (I) include bicyclo[2.1.1]hexene, bicyclo[2.2.1]heptene (i.e., norbornene), bicyclo[2.2.1]heptadiene (i.e., norbornadiene), bicyclo[2.2.2]octene, bicyclo[2.2.1]heptadiene, and bicyclo[2.2.2]octadiene. Bicyclo[2.2.1]heptene is a presently preferred unsaturated bicyclic group.

It is contemplated that the bicyclic groups represented by Expression (I) optionally may contain one or more heteroatoms (e.g., nitrogen, oxygen, sulfur, etc.) in addition to C atoms and may be substituted to contain one or more additional substituents. For example, one or more cyclic groups (including, e.g., pendant cyclic groups and ring groups fused to a ring of a bicyclic group) or acyclic groups may be attached to the bicyclic group represented by Expression (I). Thus, for example, in some embodiments the bicyclic group of Expression (I) may be present in a tricyclic or higher group.

In some embodiments, some or all of the bicyclic groups according to Expression (I) may be saturated. Non-limiting examples of saturated bicyclics include saturated homologs of the structures represented by Expression (I) (i.e., bicyclo [x.y.z]alkane, with x, y, and z as previously described) such as, for example, bicyclo[2.1.1]hexane, bicyclo[2.2.1]heptane, bicyclo[2.2.2]octane, and bicyclo[3.2.1]octane, bicyclo[4.3.2]undecane, bicyclo[5.2.0]nonane.

Suitable polyester resins, including polycyclic polyester resins as well as polyester resins without polycyclic groups may be obtained in accordance with conventional procedures well known to those of ordinary skill in the art. According to an illustrative synthesis strategy, a polyester resin is prepared by condensation (esterification) according to known processes. See, e.g., Zeno Wicks, Jr., Frank N. Jones and S. Peter Pappas, *Organic Coatings: Science and Technology*, Vol. 1, pp. 122-132 (John Wiley & Sons: New York, 1992)]. The reaction may occur in the presence of a conventional esterification catalyst at an elevated temperature with or without solvent. Generally, resins are obtained by co-polymerizing reactants that are polyfunctional with respect to OH and/or carboxylic acid. Similarly reactive derivatives of these groups also may be used. For example, anhydrides or esters of carboxylic acid may be used. Collectively, carboxylic acid, anhydrides, esters, and other derivatives of these that are co-reactive with OH to form ester linkages shall be referred to as co-reactive carboxylate functionality. The polyester resin often is derived from a mixture of reactants containing at least two of (a) one or more polyols, preferably including at least dihydroxy and optionally trihydroxy polyols; (b) one or more compounds comprising two or more co-reactive carboxylate functionalities, preferably including at least diacid and optionally triacid functionality; and (c) one or more compounds containing at least one OH group and at least one co-reactive carboxylate functionality such as a caprolactone reactant. At least one of such reactants preferably includes polycyclic functionality. In some modes of practice, the reactants are selected from those permitted under "21 CFR § 175.300 FDA" and/or comply with the European regulation "2002/72/EC".

In illustrative embodiments, a polycyclic reactant has the formula

M-(X)$_n$ (Expression II)

wherein M is a moiety comprising at least one polycyclic group; each X independently is OH, amino, isocyanate, and/or a functionality that is co-reactive carboxylate functionality; and n is at least 1 or more, desirably 2 to 3, more desirably 2.

Examples of some suitable polycyclic-containing reactants include polycyclic-containing polyols (e.g. tricyclodecane dimethanol (TCDM), isosorbide, isomannide, or isoidide); polycyclic-containing polyacids and/or anhydrides (e.g., nadic acid or anhydride); polycyclic-containing polyamines (e.g., tricyclodecane diamine); polycyclic-containing polyisocyanates (e.g., tricyclodecane diisocyanate); and combinations thereof. Difunctional polycyclic-containing reactants are preferred in certain embodiments, with diols and diacids being particularly preferred.

In some embodiments, a reactant comprising one or more polycyclic groups is derived from plant-based materials such as, for, example corn. Examples of suitable plant-based reactants include compounds derived from sugars, with anhydrosugars being preferred, and dianhydrosugars being especially preferred. Examples of suitable such compounds include bisanhydrodexitol or isohexide compounds such as, for example:

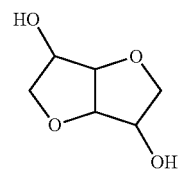

isosorbide (whose structure is depicted above), isomannide, isoidide, a monofunctional alcohol such as borneol, and derivatives or combinations thereof.

Illustrative of the polycarboxylic acids or anhydrides, that may be used to prepare the polyesters include, but are not limited to maleic acid, maleic anhydride, malonic acid, fumaric acid, succinic acid, succinic anhydride, glutaric acid, adipic acid, 2-methyl-1,6-hexanoic acid, pimelic acid, glutaric acid, methyltetrahydrophthalic acid, methylhexahydrophthalic acid, suberic acid, dodecanedioic acid, phthalic acid, phthalic anhydride, 5-tert butyl isophthalic acid, tetrahydrophthalic acid, tetrahydrophthalic anhydride, hexahydrophthalic acid, hexahydrophthalic anhydride, endomethylenetetrahydrophthalic acid, endomethylenetetrahydrophthalic anhydride, azelaic acid, sebacic acid, tetrachloro-phthalic acid, tetrachloro-phthalic anhydride, chlorendic acid, isophthalic acid, trimellitic anhydride, terephthalic acid, naphthalene dicarboxylic acid, 1,8-naphthalic anhydride, cyclohexane-dicarboxylic acid, and mixtures thereof. In some embodiments, the alkanedioic acids may contain from 4 to 12 carbon atoms. It is also understood that an esterifiable derivative of a polycarboxylic acid, such as a dimethyl ester or anhydride of a polycarboxylic acid, can be used to prepare the polyester.

Illustrative of the glycols, triols and other polyols that can be used to prepare the polyesters include, but are not limited to ethylene glycol, diethylene glycol, triethylene glycol and higher polyethylene glycols, propylene glycol, dipropylene glycol, tripropylene glycol and higher polypropylene glycols, 1,3-propanediol, 1,4-butanediol and other butanediols, 1,5-pentanediol and other pentane diols, hexanediols, decanediols, and dodecanediols, glycerol, trimethylolpropane, neopentyl glycol, hexylene glycol, trimethylolethane, neopentyl glycol, pentaerythritol, dipentaerythritol, cyclohexanedimethanol, naphthalenediol, a polyethylene or polypropylene glycol having a number average molecular weight of about 500 or less, isopropylidene bis (p-phenyleneoxypropanol-2), and mixtures thereof. In some embodiments, the aliphatic glycol may contain from 2 to about 8 carbon atoms. Other embodiments of the present invention may use aliphatic diols such as UNOXOL™ (a mixture of cis and trans 1,3- and 1,4-cyclohexanedimethanol) available from The Dow Chemical Company (Midland, Mich.). Optionally, the polyol mixture includes at least one trihydroxy or higher functional alcohol (e.g. triol) to provide branched polyesters.

Polyester resins can be obtained from reactants in which either OH functionality or the co-reactive carboxylate functionality is in excess. An excess of OH functionality tends to produce polyester resins with terminal OH groups. An excess of co-reactive carboxylate functionality tends to produce polyester resins in which the terminal groups are a co-reactive carboxylate functionality. Terminal OH functionality is presently more preferred.

The amount of excess functionality of OH or co-reactive carboxylate functionality, as the case may be, may vary over a wide range. In some modes of practice the molar ratio of the functionality in excess to the other functionality is in the range from 1.02 to 1.8, desirably 1.04 to 1.6. For example, in one mode of practice, an excess of OH is provided to provide a molar ratio of OH to co-reactive carboxylate functionality of 1.784. In another mode of practice, an excess of OH is used to provide a molar ratio of OH to co-reactive carboxylate functionality of 1.554.

As an alternative that provides a carboxyl-terminated polyester, it is may be preferable to use a two-step process. First, one prepares an OH-terminated polyester resin. Second, the OH terminated polyester is then reacted with a molar excess of co-reactive carboxylate functionality relative to OH functionality. The equivalent excess of co-reactive carboxylate functionality over OH functionality generally should be maintained so that the ratio of co-reactive carboxylate functionality to OH is in the range from about 1.02 to about 1.8 on a molar basis, and preferably from about 1.04 to about 1.6 on a molar basis. Optionally, a modest amount (e.g. 1-5% by weight) of a tri-functional monomer, e.g. trimellitic anhydride, is preferably added to increase the number average carboxyl-functionality of the polyester (co)polymer.

Typical polyester terminal groups (e.g. hydroxyl or carboxyl groups) may be chemically reacted or otherwise modified to produce other kinds of terminal functionality, such as terminal alkyl, ether, ester, amino-functional, amido-functional, or urea-polyester resins using conventional chemical synthesis methods known in the art. The terminal functional groups of a polyester resin are preferably selected to be hydroxyl groups.

In some modes of practice, it may be desirable to minimize the polar functionality of the polyester materials including in the coating composition. Generally both OH and the co-reactive carboxylate functionality are polar. Accordingly, in some embodiments it may be desirable to minimize polar functionality by converting the terminal groups to nonpolar functionality such as alkyl groups, alkoxy, combinations of these, and the like.

A polycyclic or other polyester resin useful in the coating compositions may have any suitable hydroxyl number. Hydroxyl numbers are typically expressed as milligrams of potassium hydroxide (KOH) equivalent to the hydroxyl content of 1 gram of the hydroxyl-containing substance. The polycyclic polyester resin and desirably other polyester resins (if any) preferably have a hydroxyl number from about 0 to about 50, more preferably 1 to 20, even more preferably 1 to 10 mg KOH per gram of polyester resin.

A polycyclic polyester resin or other polyester resin used in the coating compositions may have an acid number over a wide range. Acid numbers are typically expressed as milligrams of KOH required to titrate a 1-gram sample to a specified end point. The range of suitable acid numbers may vary depending on a variety of considerations including, for example, whether water dispersibility is desired. The polycyclic polyester resins and other polyester resins (if any) preferably have an acid number (AN) of about 0 to about 50 mg KOH/g (co)polymer, preferably from about one to about 20 mg KOH/g (co)polymer, more preferably from about one to about 10 mg KOH/g (co)polymer.

Methods for determining acid numbers are well known in the art. For example, acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

The one or more polycyclic polyester resin(s) and other polyester resins (if any) may have glass transition temperatures ($T_g$) selected from a wide range. Typically, any such polyester resin exhibits a glass transition temperature of from about 20° C. to about +120° C. or even higher. Polycyclic polyester resins with higher glass transition temperatures are more preferred in many embodiments wherein the Tg is in the range from 40° C. to 120° C., preferably 80° C. to 120° C. The DYNAPOL L912 polycyclic polyester resin (commercially available from Evonik Degussa GmbH, Rellinghauser Straße 1-11 Essen, NRW 45128 Germany), for example, has a Tg of 105° C. and incorporates TCDM as a polycyclic reactant to thereby incorporate polycyclic content into the resultant resin. In the practice of the present invention, Tg characteristics may be determined using differential scanning calorimetry (DSC) techniques.

The polycyclic polyester resin(s) and other polyester resin(s) (if any) may have a number average molecular weight selected from a wide range. In illustrative embodiments, a polyester resin has a number average molecular weight in the range from about 500 to about 50,000, preferably from about 500 to about 25,000, more preferably about 1,000 to about 20,000 g/mol. The commercially available DYNAPOL® L912 polycyclic polyester has a number average molecular weight of about 15,000 g/mol, an acid number of about 3 KOH/g and an OH number of about 5 KOH/g.

Coating compositions of the present invention preferably incorporate one or more phenolic resin(s), with the proviso that at least one of such one or more phenolic resins is preferably an alkylated resole phenolic resin. The term phenolic resin refers to a resin that comprises two or more phenolic repeating units. The term "phenolic" with respect to a repeating unit refers to a structure that is a residue of a reactant that comprised at least one OH directly attached to an aromatic ring structure, more typically a ring structure having six atoms in the ring (e.g., a substituted benzene ring). In many instances, a phenolic resin is obtained by reacting one or more substituted or unsubstituted phenol reactants with one or more aldehydes. Phenolic resins desirably have a number average molecular weight sufficiently high such that the resin includes 2 to 50, preferably 5 to 30, more preferably 10 to 20 phenolic repeating units on average. One or more phenolic resins are selected that help to provide desired gasket adhesion. In multilayer coating systems, interlayer adhesion also is a selection factor. In monocoat systems, interlayer adhesion is not at issue.

Examples of phenol reactants include phenol itself as well as substituted phenols. Illustrative substituted phenols often may be mono-substituted or di-substituted. If substituted phenols are used, these are preferably mono-substituted so that two sites remain for chain growth. Examples of substituted phenols include one or more of o-cresol, p-phenylphenol, p-tert-butylphenol, p-tert-amylphenol, cyclopentylphenol, p-tertoctyl phenol, bisphenol A (not preferred), resorcinol, hydroquinone, catechol, xylenol, cresylic acid, bisphenol-F (not preferred), combinations of these and the like. Examples of additional suitable substituted phenols include any of those disclosed in U.S. application Ser. Nos. 13/570,632, 13/570,743, 61/681,394, and 61/681,434. Derivatives of these reactants, such as etherified or acid functional derivatives, also may be used. Examples of aldehydes include one or more of formaldehyde, furfural, and for acetaldehyde.

Phenolic resins generally may be classed as either novolacs or resoles. A novolac resin is a phenolic resin in which an excess of phenolic reactant is used relative to aldehyde.

These are often prepared using acidic catalyst(s). Novolac resins are referred to as two stage resins as these require both heat and a curing agent for curing. A resole resin is a phenolic resin in which an excess of aldehyde is used relative to phenolic reactant. These are often prepared using alkaline catalyst(s). Resole resins are referred to as one stage resins as these can cure via heat alone without requiring the presence of a curing agent. Upon exposure to sufficient heat, resole resins are self-crosslinking. However, as an option, curing agents may still be used with resole resins if desired. Resole phenolic resins are preferred.

Suitable phenolic resins are described in Zeno Wicks, Jr., Frank N. Jones and S. Peter Pappas, *Organic Coatings: Science and Technology*, Vol. 1, pp. 184-186 (John Wiley & Sons: New York, 1992). Suitable phenolic resins also are commercially available. Examples include one or more of the resins available as BAKELITE 6470, 6535LB, 6581LB, and 6812LB products (each available from Hexion Specialty Chemicals GmbH); the DUREZ 33160, 33162 and 33310 products (Durez Corporation, Addison, Tex.); the Varcum 29-401, 2227 B 55, and 29-115 products (Durez Corporation, Addison, Tex.); PHENODUR PR 285 55/IB/B, PR 516/60B, PR 812, and PR 897 products (each available from CYTEC Surface Specialties, Smyrna, Ga.); the SANTOLINK EP 560 product; the SFC 112 and 142 products (each available from the SI Group, previously Schenectady), and mixtures thereof. Other trade designations for phenolic resins include RESINOX™ from Monsanto Chemical Co. (St. Louis, Mo.); AROFENE™ and AROTAP™ from Ashland Chemical Co. (Dublin, Ohio).

One factor believed to impact the compatibility of phenolic resins with a particular type of polyester resin is the nature of the phenolic resin and the type of functionality incorporated into phenolic constituents, and the location of that functionality on the phenolic rings. Advantageously, the present invention appreciates that alkylated resole phenolic resins demonstrate excellent compatibility with polycyclic polyesters while also providing coating performance that allows the coatings to be used as alternatives to conventional coatings based on PVC and/or epoxy chemistries. The chemistries are also selected to help promote adhesion to gasket materials. For example, it is believed that this helps improve gasket and/or substrate adhesion. This improved adhesion is particularly advantageous in monocoat embodiments. Without wishing to be bound by theory, it is believed that the combination of a preferred alkylated resole phenolic resin with a polycyclic polyester promotes interpenetration of the compositions to provide the excellent adhesion that has been observed.

An alkylated phenolic resin includes at least one pendant alkyl group that may be linear, branched, or cyclic. Exemplary alkyl groups have 1 to 10, preferably 1 to 5 carbon atoms, more preferably 1 to 4 carbon atoms. In the alkylated phenol resins, the alkyl group may be methyl (cresol), butyl, cyclohexyl, phenyl, combinations of these, and the like.

A cresol resin is one kind of alkylated phenolic resin that is derived from a substituted phenol having a methyl group substituted onto the ring of the phenol. Much of the world's supply of cresol occurs naturally. When made synthetically, a cresol phenolic resin is typically prepared either by methylation of phenol, or by hydrolysis of chlorotoluene. Depending upon temperature, a cresol resin may be a solid or a liquid because its melting point is close to room temperature. Both novolac and resole resins can incorporate cresol content. In some embodiments, a cresol resole phenolic resin in addition to at least one other alkylated resole phenolic resin is incorporated into the coating compositions.

In some embodiments, a cresol resole phenolic resin is the only alkylated resole phenolic resin, and this optionally is used in combination with one or more other types of phenolic resins.

For example, another type of phenolic resin useful in the practice of the present invention includes etherified phenolic resins, preferably of the resole type. Etherified phenolic resins include one or more pendant ether and/or pendant polyether moieties. Phenolic resins, such as resins resulting from the reaction of phenol and formaldehyde, typically have pendant methylol groups. Often, it is such methylol groups that are etherified. In such resins in which a methylol group is etherified, the ether group is not directly linked to the aromatic group. Preferred etherified phenolic resins include ethers of the formula —OR, wherein R is an alkyl group of 1 to 10, preferably 1 to 6, more preferably 1 to 4 carbon atoms. In exemplary embodiments, R is methyl, ethyl, propyl, i-propyl, n-butyl, i-butyl, and/or t-butyl. Preferably, R is n-butyl.

In some embodiments, the coating compositions include a resole type phenolic resin that is phenol based and at least one other resole type phenolic resin that is alkylated. Phenol resins that have pendant ether functionality also may be used. A phenolic resin that is not alkylated is referred to as being non-alkylated. A phenolic resin that is not etherified is referred to as being non-etherified.

The weight ratio of the alkylated phenolic resin to the non-alkylated phenolic resin in such embodiments preferably is in the range from 1:50 to 50:1, more preferably 1:10 to 10:1, and even more preferably 1:3 to 3:1. In some embodiments, the non-cresol resin is optional. In one embodiment, the weight ratio of the at least one polyester resin in the first coating to the total amount of the cresol resole and non-cresol resole phenolic resins is in the range from 1:50 to 50:1, preferably 1:4 to 4:1, even more preferably about 2:1. By using a polycyclic polyester in combination with these phenolic resins, the coating composition can replace conventional PVC-based organosol coatings.

In one illustrative formulation, a coating composition includes (a) 15 to 45, preferably 20 to 30 weight percent of at least one polycyclic polyester resin; (b) 5 to 60, preferably 15 to 45 weight percent of one or more phenolic resins: (c) to 25, preferably 5 to 15 weight percent of a filler particle (e.g., inorganic filler particle) such as $TiO_2$; (d) optionally a sufficient amount of an additive such as a wax to help extend life of tooling used to form coated substrates into closure shapes; and (e) 20 to 70, preferably about 30 to 50 weight percent of a suitable solvent such as, e.g., xylene, aromatic naptha(s), dibasic esters, or combinations of these. In a preferred embodiment, the phenolic resins include 5 to 10 parts by weight of an alkylated resole phenolic resin (such as a cresol resin) per 5 to 15 parts by weight of a non-alkylated resole phenolic resin. Preferably, each phenolic resin used in the coating compositions is substantially free of mobile BPA, BPF, BPS and derivatives thereof whether or not such derivatives are mobile.

The combinations of phenolic resins used in the coating compositions provides compositions with moderate crosslinking characteristics to enhance adhesion to sealing compounds even when the coating composition is substantially free of PVC content. This is advantageous to avoid PVC content, as previously PVC has been used widely in top coats to obtain suitable adhesion characteristics. In contrast, if the crosslink density is too high, adhesion could be reduced more than would be desired. The combinations of phenolic resins, further in combination with the polycyclic polyester resin(s) also contribute to corrosion resistance.

Without wishing to be bound by theory, it is believed that optional ether functionality (if any) of the phenolic resin(s) used in the coating compositions helps to provide resultant coatings that show excellent adhesion to sealing compounds used as closure gaskets without having to use PVC chemistries in the coating composition. Conventionally, many gasket materials are PVC-based and do not show good adhesion to coatings unless those coatings incorporate PVC or epoxy resins. By using a polycyclic polyester in combination with these phenolic resins, the coating compositions can replace conventional PVC-based organosol coatings to exhibit excellent adhesion to gasket materials, including PVC-based gasket materials. The combination of phenolic resins also provides enhanced corrosion resistance without being too soft. The combination also contributes to flexibility and adhesion to allow coated substrates to be formed into closure shapes after coating. The combination also is compatible with the polycyclic polyester resin component.

If desired, the coating compositions may optionally include other additives that help to improve the manufacturability or use of the coating compositions or that help to improve the resultant coatings.

Suitable optional additives include, for example, those that improve the processability or manufacturability of the composition, enhance composition aesthetics, or improve a particular functional property or characteristic of the coating composition or the cured composition resulting therefrom, such as adhesion to a substrate or adjacent composition. Additives that may be included are carriers, additional polymers, emulsifiers, pigments, metal powders or pastes, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Other optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient can be included in a sufficient amount to serve its intended purpose, but preferably not in such an amount to adversely affect a coating composition or a cured coating resulting therefrom.

Exemplary crosslinkers used in a coating composition of the present invention include, but are not limited to, phenol-formaldehyde resins; amino-formaldehyde resins including but not limited to urea-formaldehyde, melamine formaldehyde, benzoguanamine formaldehyde; anhydride resins, phenolic crosslinkers (e.g., phenoplasts), amino crosslinkers (e.g., aminoplasts), materials with blocked isocyanate functionality, materials with epoxy functionality including but not limited to polyesters, (meth) acrylic resins, vinyl resins or the like.

Blocked isocyanate crosslinking agents are suitable in many embodiments. A blocked isocyanate is a material including blocked isocyanate functionality that is unmasked upon heating to enable isocyanate crosslinking reactions. While the isocyanate functionality is blocked, the materials typically are stable and substantially non-reactive. If an NCO-functional material is provided in unblocked form, it is possible that the unblocked material may participate in crosslinking reactions sooner than might desired, e.g., while a formulation is in storage for future use. The temperature at which the blocking is released can vary depending upon the type of blocked isocyanate being used. In many instances, blocking is released at temperatures in the range of 120° C. to 250° C., which conveniently is a suitable temperature range for carrying out crosslinking reactions in many modes of practice. Upon release of the blocking, the resulting polyisocyanates can react with other co-reactive functionality on resins to be crosslinked, such as carboxylate, hydroxyl or amine (primary or secondary) functionality to form amide, urethane or urea linkages.

Suitable embodiments of blocked isocyanates are compounds comprising cyclohexyl moieties such as a blocked isophorone diisocynate (IPDI). Linear, aliphatic blocked isocyanates also would be suitable in many modes of practice. One example of a linear, aliphatic blocked isocyanate is a blocked hexamethylene diisocyanate (HMDI). Aliphatic materials are preferred to avoid the generation of aromatic amines by hydrolysis. Blocked isocyanates in many instances are not pure dimers but are oligomers (isocyanurate, biuret, or similar structures) based on the dimer in order to help reduce vapor pressure.

One optional ingredient is a catalyst to increase the rate of crosslinking of the phenolic resins. If used, a catalyst is preferably present in an amount of at least 0.05%, and more preferably at least 0.1%, by weight of nonvolatile material. If used, a catalyst is preferably present in an amount of at most 1%, and more preferably at most 0.5%, by weight of nonvolatile material.

Examples of catalysts, include, but are not limited to, strong acids (e.g., dodecylbenzene sulphonic acid (ddbsa, available as CYCAT 600), methane sulfonic acid (msa), p-toluene sulfonic acid (ptsa), dinonylnaphthalene disulfonic acid (dnndsa), and triflic acid), quaternary ammonium compounds, phosphorous compounds, zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, like a wax, which facilitates manufacture of metal closures by imparting lubricity to sheets of coated metal substrate. Waxes also may provide coatings with scratch resistance. A lubricant is preferably present in the coating composition in an amount of 0 to 2%, and preferably 0.1 to 2%, by weight of nonvolatile material. Preferred lubricants include, for example, Carnauba wax and polyethylene type lubricants.

The coating compositions may incorporate one or more pigments. Examples include aluminum flake, zinc oxide and titanium dioxide, and combinations of these. Such pigments may protect against headspace corrosion and darkening of the interior container liner, for example, by acting to scavenge hydrogen sulfide emitted by packaged foodstuffs. If pigments are used, the resulting coating composition often may have a pigment-to-resin ratio of about 1:50 to 1:2, preferably 1:20 to 1:6, more preferably 1:15 to 1:6.

The removable closure of the invention also may include a gasket formed from a suitable sealing composition. The sealing composition is a material that is applied to at least a portion of the top or exposed surface of the coating for the purpose of assisting in sealing the closure to a container. Structurally, a preferred closure using a sealing composition on a monocoat would comprise a substrate, the monocoating formed from a coating composition of the present invention, and a gasket directly or indirectly on the monocoating.

Generally, sealing compositions are well known in the industry and any may be used. Some are solid components as applied. Others are fluids that chemically or physically cure to form solid gasketing material. As an example, a sealing composition may comprise at least about 10, more preferably at least about 25, and even more preferably at least about 30 wt-% of thermoplastic material, based on the total nonvolatile weight of the of the sealing composition. For non-solid sealing compositions, the sealing composition preferably includes less than about 60, more preferably less than about 55, and even more preferably less than about 50 weight percent ("wt-%") of thermoplastic material, based on the total nonvolatile weight of the compound. As previously discussed herein, halogenated polyolefins such as PVC are commonly used thermoplastic materials in closure sealing compositions. In some instances, these polyolefins have high molecular weight, e.g, number average molecular weights over 20,000, even over 50,000. While not intending to be bound by any theory, in some embodiments, the incorporation of a suitable amount of thermoplastic material into the closure compound is believed to be important in achieving good compatibility and adhesion between a sealing composition and the coated closure.

Examples of useful sealing composition include, for example, PVC-containing sealing compositions (including, e.g., plastisols) for sealing closures to food or beverage containers. In some embodiments, the sealing composition may contain a polypropylene additive. Preferred sealing compositions are at least substantially free of mobile or bound PVC, bisphenol A, F, or S. In some embodiments, the preferred sealing composition is also at least substantially free of mobile and bound bisphenol compounds, including epoxides thereof.

The total film thickness of the cured coating systems of the present invention may vary depending upon a variety of factors, including, for example, the desired properties (e.g., mechanical properties, aesthetic properties, corrosion resistance, etc.) of the cured coating system, the substrate upon which the coating system is applied, the presence of substances that may contact the cured coating system (e.g., certain aggressive or corrosive products), and/or the intended use of the coated article. In presently preferred embodiments, the total dry film weight of a coating is at least about 0.2, more preferably at least about 2, and even more preferably at least about 5 $g/m^2$ (grams per square meter). Preferably, the total dry film weight of a cured coating (not including any sealing composition that may be present) is less than about 30 $g/m^2$, more preferably less than about 25 $g/m^2$, and even more preferably less than about 20 $g/m^2$.

Preferably, the coating composition of the present invention comprises a liquid carrier. The carrier liquid is typically at least substantially non-aqueous. While not preferred, in some embodiments a relatively low amount of water may be included so long as the coating composition is not unsuitably affected. In illustrative embodiments, the liquid carrier includes less than 2 weight percent water, if any, based on the total weight of the liquid carrier.

Examples of suitable liquid carriers include an organic solvent, a plasticizer, or mixtures thereof. Suitable organic solvents include, for example, aliphatic hydrocarbons, like mineral spirits, kerosene, and high flash VM&P naphtha; aromatic hydrocarbons, like toluene, benzene, xylene and blends thereof (e.g., the Aromatic Solvent 100 product); alcohols, like isopropyl alcohol, n-butyl alcohol, and ethyl alcohol; ketones, like cyclohexanone, ethyl aryl ketones, methyl aryl ketones, and methyl isoamyl ketone; esters, like alkyl acetates (e.g. ethyl acetate and butyl acetate); glycol ethers like ethylene glycol monoethyl ether, ethylene glycol monoethyl ether, ethylene glycol monobutyl ether, and propylene glycol monomethyl ether; glycol ether esters, like propylene glycol monomethyl ether acetate; aprotic solvents, like tetrahydrofuran; chlorinated solvents; mixtures of these solvents and the like. Preferred liquid carriers have sufficient volatility to evaporate substantially from the coating system during the curing process.

Examples of suitable plasticizers include phosphates, adipates, sebacates, epoxidized oils (not preferred, but may be used in certain embodiments if desired), polyesters, and combinations thereof.

Coating compositions for use in the present coating system can be prepared using any suitable method to preferably provide sufficient suspension and dispersion of the components included therein. Examples of suitable process methods include solution blending, high-speed dispersion, high-speed milling, and the like. A substantially homogeneous dispersion of the components throughout a liquid carrier typically indicates an adequate mixture or blend.

Preferably, the cured systems are retortable when used in food and beverage container applications. Preferred cured coatings of the present invention can withstand elevated temperature conditions frequently associated with retort processes or other food or beverage preservation or sterilization processes. As discussed above, particularly preferred cured coating systems exhibit enhanced resistance to such conditions while in contact with food or beverage products that exhibit one or more aggressive (or corrosive) chemical properties under such conditions.

The coating system of the present invention can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of pre-metered coating. In one embodiment where the coating is used to coat metal sheets or coils, the coating can be applied by roll coating.

The coating system can be applied to a substrate prior to, or after, forming the substrate into an article. Preferably, at least a portion of the substrate is coated with the coating system of the present invention, which is then at least partially cured before the substrate is formed into an article. In presently preferred embodiments, the following method is used: (1) the coating composition is applied to at least a portion of the substrate, (2) the coating composition is at least partially cured, (3) the coated substrate is shaped to form a closure (e.g., via stamping), (4) the coating is more completely cured if applicable; and (5) a sealing compound is then applied to the cured coating to help provide a gasket for sealing the closure to its corresponding container. Optionally, the further curing of step (4) can be practiced concurrently with and/or after step (5)

Coating systems of the present invention are preferably cured to form a hardened coating system. After applying the coating system onto a substrate, the coating compositions of the present invention can be cured using a variety of processes, including, for example, oven baking by either conventional or convectional methods, or any other method that provides an elevated temperature. The curing process may be performed in either discrete or combined steps. For example, substrates can be dried at ambient temperature to leave the coating compositions in a largely un-crosslinked state. The coated substrates can then be heated to more fully cure the compositions. In certain instances, coating compositions can be dried and cured in one step.

The curing process may be performed at temperatures in the range of about 177° C. to about 232° C. for about 5 seconds to 1 hour, preferably about 3 minutes to about 15 minutes, preferably about 3 minutes seconds to about 10 minutes, taking into account, however that the upper end of the temperature range can change depending on the decomposition temperature(s) of the coating constituents.

The FIGURE schematically shows a cross-section of an illustrative closure 10 of the present invention. Closure 10 in this embodiment is the type of circular closure that functions as a lid on a glass jar such as a pickle or sauerkraut container. Closure 10 includes substrate 12 that has annular sidewall 14 extending from the rim 15 of circular panel 16. In an actual closure, the sidewall 14 would include features such as threading features (not shown) by which closure 10 would threadably engage corresponding thread features (not shown) of a corresponding container (not shown).

A coating system of the present invention is provided on the interior surfaces 17 and 19 of sidewall 14 and panel 16. The coating system includes a coating 18 formed from a coating composition of the present invention. Annular gasket 22 is provided on a coating surface portion 20. When closure 10 seals the corresponding container, the gasket sealingly engages the rim (not shown) of the container for a more secure seal (e.g., an airtight seal).

The present invention will now be further described with regard to the following illustrative examples. All percentages and concentrations are on a weight basis unless otherwise expressly noted.

Example 1

Monocoat Closure Coatings

A coating composition of the present invention was prepared from the following recipe:

| Step | Ingredients | |
|---|---|---|
| 1 | Hydroxylated polycyclic linear polyester Number average molecular mass: 15,000 Acid value (mg KOH): 3 Hydroxyl value (mg KOH): 5 | 20-30% |
| 1 | Solvent mixture Solvent Naphta, light Aromatic Solvent Naphta, heavy aromatic Dibasic esters | 30-40% |
| 2 | TiO$_2$ | 5-15% |
| 3 | Xylene | 10-20% |
| 4 | phenol formaldehyde resin resole type | 5-15% |
| 4 | Resol cresol formaldehyde resin (alkylated) | 5-10% |
| 4 | Blocked aliphatic polyisocyanate based on IPDI | 0-2% |
| 4 | Low molecular weight polyester | 1-3% |
| 4 | Polyethylene wax | 0.5-1.5% |
| 4 | Silicones and polymers additive | 0-1% |
| 5 | Xylene | 1-5% |

Step 1: Pellets of the polycyclic polyester resin were dissolved in the solvent mixture for at least 3 hours with a high speed disperser. The temperature was limited to 60° C. Good dispersion was indicated by a smooth mixture and the absence of bits. Mixing caused the temperature of the mixture to increase. This temperature increase was allowed to occur while making sure that the temperature did not increase so much to create an undue risk of thermal degradation of the resin. The temperature increased during this step was desirable to speed up the dissolution phase. After a smooth mixture was obtained, the mixture resulting from Step 1 was allowed to cool to room temperature.

Step 2: After cooling, a part of the resin solution was used to pre-disperse the titanium dioxide by high speed stirring. The weight ratio between the polycyclic polyester resin and the titanium dioxide powder in the pre-dispersion was 1:1. The fineness of dispersion is controlled with a grind gauge, the target being to reach 15 μm or less particle size. The temperature was limited to about 60° C.

Step 3: The TiO$_2$ pre-dispersion was thoroughly combined and mixed into the main part of the mixture containing the polycyclic polyester resin recipe. Then, Xylene was added with stirring.

Step 4: Crosslinkers were added under stirring only when the temperature of the base had dropped under 40° C. Then, the blocked polyisocyanate, the wax and the other additives were added. In this step, all the ingredients were introduced one after the other with sufficient mixing between each ingredient to help ensure that the dispersion was smooth and homogeneous before the next ingredient was added.

Step 5: The coating was thinned down to a desired viscosity with xylene.

Example 2

Production of a Closure with Monocoat Coating

Closure samples were prepared that are coated on interior surfaces with a monocoat coating. One closure sample was prepared using the coating composition of Example 1 (example of the present invention). For comparison, a second closure sample (Comparison A) was prepared using a commercially available PVC organosol (commercially available from Valspar Corporation) including both a PVC resin and a phenolic resin incorporating BPA. For additional comparison, a third closure sample (Comparison B) was prepared using a commercially available PVC organosol (commercially available from Valspar Corporation) including both a PVC resin and a phenolic resin incorporating BPA. Comparatives A and B have been used as monocoats for non-aggressive foodstuffs, where their chemical resistance is acceptable.

Generally, coating compositions derived from PVC resins and phenolic resins incorporating BPA typically demonstrate excellent performance in the closure coating industry. From one perspective, such PVC and BPA containing coatings set the standard against which other kinds of coatings are measured. It is desirable to prepare coatings from materials that do not include PVC and BPA materials, but doing this poses significant challenges. The properties provided by PVC and BPA materials are hard to match. These examples and the data presented in these examples shows that coating compositions of the present invention are significant as achieving the level of performance associated with PVC and BPA containing coatings.

To prepare each sample, the coating composition was applied on electrolytic tinplate (ETP). ETP standard features in the closures industry are 0.15-0.18 min thickness, 2.8 g/m$^2$ or 2.0 g/m$^2$ tin level, TH580 or TH620 temper. Higher corrosion resistance generally is achieved by selecting tinplate with a 2.8 g/m$^2$ tin level. Consequently, the tinplate used to prepare the samples had a 2.8 g/m$^2$ tin level The coating composition was applied as a monocoat on the substrate at 25 grams per square meter wet in order to achieve a dry film weight close to 11 grams per square meter after curing 10 minutes at 200° C. (peak maximal temperature reached by the coated substrate) in an air drying oven. An external varnish was applied on the external side of the closure and cured 10 minutes at 200° C. Then, the coated panels are overcured 20 minutes at 190° C. in order to simulate external decoration. The coated ETP was stamped with a press to fabricate the closure. Then a liquid gasket compound was applied in the channel of the closure and cured 2 minutes at 200-220° C. (depending on the compound specifications) to form a gasket.

Example 3

Testing of Monocoat Closures

A. Corrosion Test:

The coating composition of Example 1 and Comparisons A and B were tested to evaluate corrosion resistance. Accelerated and standard tests were used.

performance of Comparisons A and B. Remarkably, the coating composition of Example 1 outperformed Comparison A and B in the short and long term, even though A and B include PVC and BPA constituents. Comparisons A and B showed blisters after only 1 week. The sample with the coating composition of Example 1 showed no evidence of blistering after three weeks and only a very slight degree of corrosion after 20 weeks.

| Monocoat | 1 week | 2 weeks | 3 weeks | 6 weeks | 10 weeks | 20 weeks |
|---|---|---|---|---|---|---|
| Comparison A | blisters | blisters | Blisters + corrosion points | corrosion | — | — |
| Comparison B | Slight blisters | blisters | blisters | corrosion | — | — |
| Coating composition of Example 1 (BPA and PVC free) | OK | OK | OK | OK (3 caps out of 6 with less than 3 corrosion points) | OK (3 caps out of 6 with less than 4 corrosion points) | 3 caps with corrosion 3 caps with less than 8 corrosion points |

Accelerated Test:

Glass jars are filled with an acidic reagent containing 0.35% acetic acid and 0.35% NaCl in water. This is considered to be a medium aggressive corrosive solution. A monocoat at a dry coating weight of 10 to 12 g/m² would not be expected to withstand this corrosive reagent effectively without showing undue evidence of corrosion. Generally, it would be expected that such a monocoat could survive only mildly corrosive reagents. Yet, the desire to uncover more corrosion resistant monocoats is strong. As compared to a multilayer coating system, a monocoat is quicker and more economical to fabricate. In particular, only one baking step is needed, to save substantial energy and costs due to only having to implement half the heating demand associated with a two-coat system.

The jars are closed under vacuum with the closures to be tested. For each monocoat coating evaluation, a minimum of 6 closures are tested. Closed jars are stored at room temperature and at 35° C. or 40° C. depending on the solution used for the test. Every week for hot box storage and every two weeks for room temperature storage, the closures are examined to determine if corrosion attacks can be visually noticed. The resistance of the different coatings is then compared.

Standard Test:

Glass jars are filled with real food. Different foodstuffs are selected to evaluate a range of aggressiveness levels. The jars are closed under vacuum with the closures to be tested. For each coating composition, a minimum of 6 closures are tested. Closed jars are stored at room temperature and at 40° C. Depending on the aggressiveness of the food, jars are opened after 2, 3 or more months. The resistance of the different coatings to corrosion is then compared.

The test results are reported in the following table. The data would be significant if the sample prepared with Coating Composition 1 could match or even approach the B. Pack Tests with Real Food The coating composition of Example 1 and Comparison C were tested to evaluate corrosion resistance versus apple puree, chicken baby food, ketchup, and salad sauce. Comparison C was a two-coating system (BPA system) using an epoxy phenolic size coating (10.3 mg/m²) and a PVC organosol top coating (5.7 g/m²). Again, coatings derived from PVC and BPA containing materials set the performance standard against which other coatings are measured. To match or approach the performance of a PVC and BPA containing coating is a significant accomplishment in the industry. The data reported in the following tables shows that the coating composition of Example 1 closely approaches that of Comparison Sample C.

Apple Puree

|  | 5 months |
|---|---|
| Example 1, Non BPA monocoat | ok |
| Comparison C, BPA system | ok |

Chicken Babyfood

|  | 1 month | 5 months |
|---|---|---|
| Example 1, Non BPA monocoat | ok | ok |
| Comparison C, BPA system | ok | ok |

Ketchup

|  | 2 months | 5 months |
|---|---|---|
| Example 1, Non BPA monocoat | 1 bubble at the featheredge | Few bubbles at the featheredge |
| Comparison C, BPA system | ok | ok |

Salad Sauce

|  | 1 month | 5 months |
|---|---|---|
| Example 1, Non BPA monocoat | Few corrosion points at the featheredge | Corrosion at the featheredge |
| Comparison C, BPA system | ok | ok |

C. Compound Adhesion Test:

The coating composition of Example 1 and Comparisons A and B were tested to evaluate gasket adhesion. Specifically, the aim of this test is to determine if the gasket compound will be adherent enough to the monocoat coating in order to ensure a good vacuum during sterilization or pasteurization of the filled jars. For each sample, the test is carried out on flat panels coated with the coating composition at 11 grams per square meter on ETP (2.8 g/m$^2$ tin). A 1 mm thickness strip of liquid sealing compound is applied on the coating. The sealing compound is cured 1 minute and 30 seconds at 200° C. After cooling, the compound is pulled off the panel to assess the force required to do so. Greater force indicates stronger adhesion. Compound 469 refers to a gasket material that is PVC-based. The results are shown in the following table. Remarkably, the adhesion of Example 1 without PVC or BPA matches Comparisons A and B before pasteurization and is better after pasteurization. This is unexpected in that Comparisons A and B are both PVC-based like the gasket material and would be expected based on the chemical similarity to show better adhesion to the PVC-based gasket material than Example 1.

| | Compound adhesion (Compound 469 - cured 90" @ 200° C.) | |
|---|---|---|
| monocoat | Before pasteurization | After pasteurization |
| Comparison A | 5 | 4 |
| Comparison B | 5 | 4 |
| Example 1 | 5 | 5 |

Notation:
5: the best - strong adhesion; unable to remove the compound
0: the worst - very easy to remove the compound Example 4

Influence of Phenolic Resins on the Performance of a Monocoat

This example uses coating compositions of the present invention that used the formulation of Example 1 as a base recipe. In this example, one coating sample was prepared without any phenolic resin. For the other samples, individual phenolic resins and a combination of phenolic resins were added to the base recipe. The base recipe without phenolic resin is a reference standard by which to assess compound adhesion. The compound adhesion and corrosion resistance in CT4, S1, and TME solutions were evaluated. CT4 is a solution of sodium chloride (4.5%) and acetic acid (4.5%) in water. S1 is acetic acid (5%) in water. TME is 0.52 g of Na$_2$S$_2$O$_5$, 40 g acetic acid, and 5 g sodium chloride per liter of water.

The formulations and results are shown in the following tables. The data shows that combinations of phenolic resins (Samples P3 and P5) generally perform much better than individual phenolic resins (Samples P1, P2, and P4). The data shows that Sample P3 provided an excellent combination of compound adhesion (before and after retort, or pasteurization), blush resistance, and corrosion resistance.

| Phenolic sample | Phenolic resin type | Compound adhesion | | Blush after retort |
|---|---|---|---|---|
| | | Before retort | After retort | |
| None (base) | none | 4.5 | 3.5 | ok |
| P1 | Phenol formol highly alkylated | 1 | 1 | ok |
| P2 | Phenol formol resol type etherified | 0 | / | ok |
| P3 | Phenol formol resol type + resol formol highly alklated | 4.5 | 4.5 | ok |
| P4 | Alkylphenol resol, etherified | 0 | / | ok |
| P5 | Butylated phenol/cresol | 4.5 | 3.5 | strong |

| Corrosion resistance in CT4 solution | | | Corrosion resistance in S1 solution | | | Corrosion resistance in TME solution | | |
|---|---|---|---|---|---|---|---|---|
| CT4 1 sem | CT4 2 sem | CT4 3 sem | S1 1 sem | S1 2 sem | S1 3 sem | TME 1 sem | TME 2 sem | TME 3 sem |
| + | +- | - | - | | - | - | | |
| + | +- | - | +- | +- | | +- | | |
| + | + | + | + | + | + | + | + | + |
| + | + | +- | +- | +- | | + | - | |
| + | +- | - | + | + | +- | + | +- | |
| + | +- | +- | - | | | - | | |

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of making a removable closure for use in sealing a food or beverage container, the method comprising:
   (a) providing a metal-containing substrate;
   (b) providing a coating composition, said coating composition incorporating ingredients comprising:
      (i) at least one polycyclic polyester resin, wherein the polycyclic polyester resin comprises first and second fused rings that share at least one atom in common; and
      (ii) first and second crosslinkable, resole phenolic resins that are different from one another, the first crosslinkable, resole phenolic resin comprising a crosslinkable, alkylated resole phenolic resin; and
      wherein the coating composition is substantially free of resins and resin precursors comprising covalent halogen-containing functionality, and wherein the coating composition is substantially free of resins and resin precursors incorporating bisphenol A;

(c) applying the coating composition onto at least a portion of a surface of the substrate under conditions effective to provide a dried coating having an average dry film weight of 1 to 25 grams per square meter of coated surface area;
(d) at least partially curing the applied coating composition to form a coating on the substrate;
(e) forming the coated substrate into a removable closure comprising the coating on an interior surface of the closure; and
(f) providing a gasket to at least a portion of the coating on the interior surface of the closure, wherein the gasket is adhered to the coating.

2. The method of claim 1, wherein the polycyclic polyester resin has an acid number of less than 10.

3. The method of claim 1, wherein the polycyclic polyester resin has a glass transition temperature greater than 50° C.

4. The method of claim 1, wherein the polycyclic polyester resin has a glass transition temperature greater than 70° C.

5. The method of claim 1, wherein the polycyclic polyester resin comprises one or more polycyclic groups derived from one or more ingredients comprising tricyclodecanedimethanol.

6. The method of claim 1, wherein the step of providing the coating composition further comprises providing at least one compound comprising blocked isocyanate functionality.

7. The method of claim 6, wherein the at least one compound comprising blocked isocyanate functionality comprises a blocked isophorone diisocyanate compound.

8. The method of claim 6, wherein the at least one compound comprising blocked isocyanate functionality comprises a cyclohexyl moiety comprising at least two pendant blocked isocyanate groups.

9. The method of claim 1, wherein the polycyclic polyester resin has a number average molecular weight of at least 4,000, a glass transition temperature of at least 30° C., and a hydroxyl number of less than 25.

10. The method of claim 1, wherein the coating composition comprises 15 to 45 weight percent of at least one polycyclic polyester resin, 5 to 60 weight percent of the first and second crosslinkable, resole phenolic resins, 0 to 25 weight percent of at least one filler particle, and 20 to 70 weight percent of a solvent.

11. The method of claim 1, wherein the coating has an average dry film weight of from 9 to 13 grams per square meter of coated surface.

12. The method of claim 1, wherein the applied coating is a monocoat coating, and wherein the gasket is applied directly onto the monocoat coating.

13. The method of claim 1, wherein the polycyclic polyester resin further comprises at least one bridged ring sharing three or more atoms in common with at least one of the first and second fused rings.

14. The method of claim 1, wherein the coating composition is substantially free of polyvinyl chloride.

15. The method of claim 1, wherein the coating composition is substantially free of mobile and bound bisphenol A, mobile and bound bisphenol F, mobile and bound bisphenol S, and mobile and bound diepoxides of any of these bisphenols.

16. The method of claim 1, wherein the second crosslinkable, resole phenolic resin is non-alkylated.

17. The method of claim 1, wherein the polycyclic polyester resin comprises one or more substituted and/or unsubstituted polycyclic groups selected from

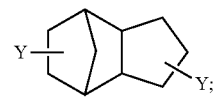

Tricyclodecane-based

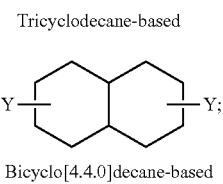

Bicyclo[4.4.0]decane-based

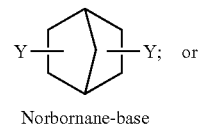

Norbornane-base

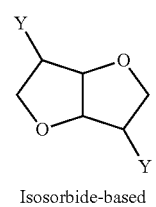

Isosorbide-based wherein each Y independently is a bond that connects the polycyclic group to another portion of the resin.

18. The method of claim 1, wherein a polycyclic group of the polycyclic polyester resin comprises a substituted or unsubstituted moiety of the formula, wherein each Y independently is a bond that connects the polycyclic group to another portion of the resin:

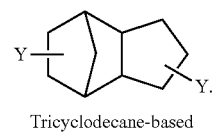

Tricyclodecane-based

19. The method of claim 1, wherein the gasket comprises a PVC resin.

20. The method of claim 1, wherein the polycyclic polyester resin has a backbone and a plurality of polycyclic moieties are incorporated into the backbone, or a plurality of polycyclic moieties are pendant from the backbone.

21. The method of claim 1, wherein an acidic food item is stored in the container.

22. The method of claim 1, wherein an acidic beverage is stored in the container.

23. The method of claim 1, wherein the fused rings share at least 2 atoms in common.

24. The method of claim 1, wherein the second crosslinkable, resole phenolic resin, is an alkylated crosslinkable, resole phenolic resin that is different from the first crosslinkable, alkylated resole phenolic resin.

25. The method of claim 1 wherein the removable closure is subjected to retort, and the coating composition remains adhered to the substrate after retort.

* * * * *